UNITED STATES PATENT OFFICE.

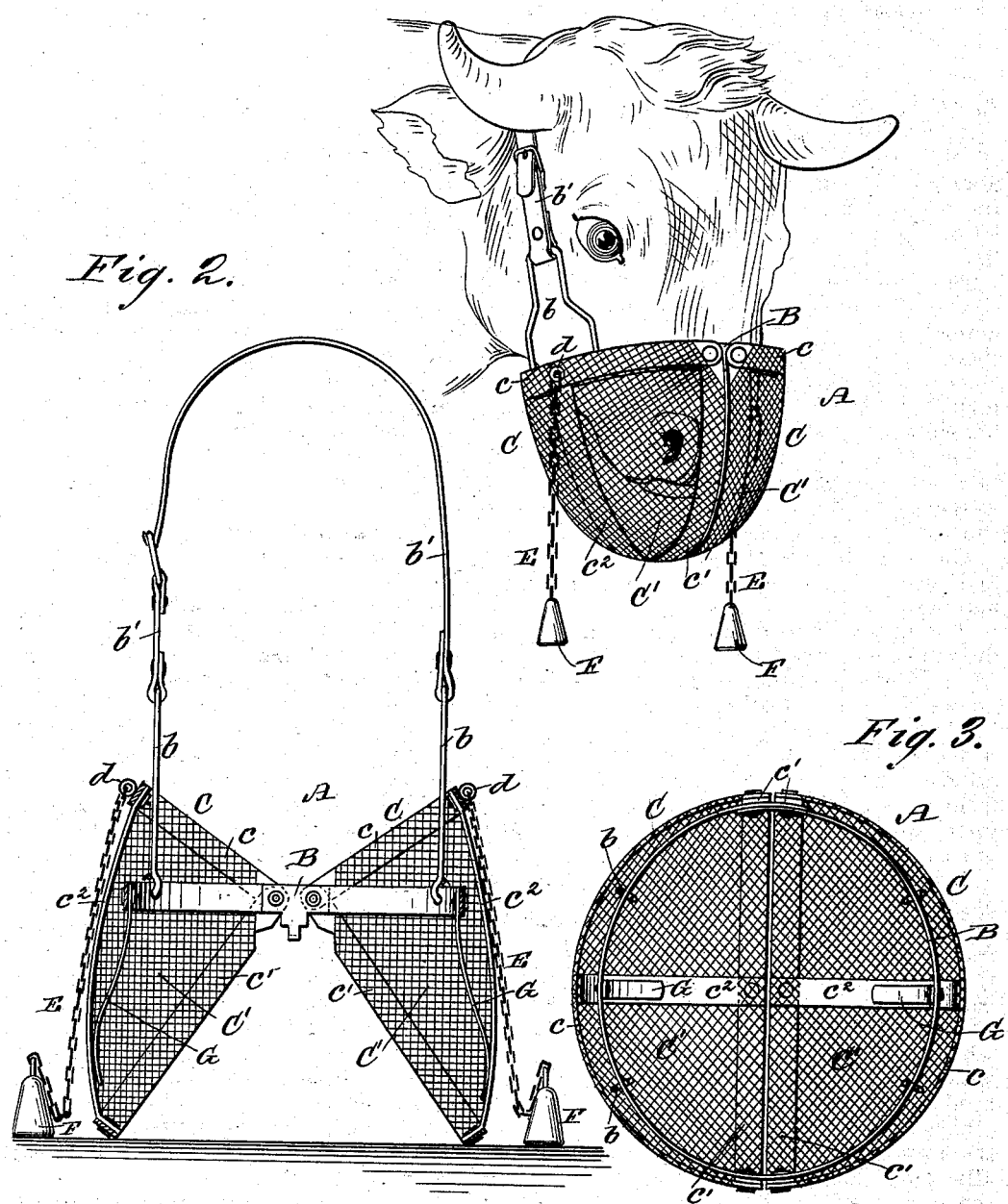

PHILIP PRIOLEAU, JR., OF MELROSE, FLORIDA.

MUZZLE FOR CATTLE.

SPECIFICATION forming part of Letters Patent No. 322,199, dated July 14, 1885.

Application filed April 16, 1885. (Model.)

*To all whom it may concern:*

Be it known that I, PHILIP PRIOLEAU, Jr., of Melrose, in the county of Putnam and State of Florida, have invented a new and Improved Muzzle for Cattle, of which the following is a full, clear, and exact description.

The object of my invention is to provide a new and improved muzzle, which enables the animal provided with one to eat grass and short weeds with perfect ease and convenience, and which prevents the animal from injuring fruit-trees while pasturing in orchards, orange-groves, &c.

The invention consists of a muzzle divided in two hinged parts, each provided with a weight and a spring for closing and opening the two hinged parts.

The invention also consists in various parts and details, hereinafter more fully set forth and described.

Reference is to be had to the accompanying drawings, forming part of this specification, in which similar letters of reference indicate corresponding parts in all the figures.

Figure 1 is a perspective view of the improved muzzle, showing the same closed and attached to an animal's head. Fig. 2 is a front view of the same, showing the muzzle open, and Fig. 3 is a plan view showing the muzzle closed.

The muzzle A is provided with a round or oval-shaped band, B, to which are hinged, on its front and rear, the spherically-shaped frames C C, each covered with a wire-netting, C'. Each frame C consists of the half-round band $c$, and the curved cross-bands $c'$ and $c^2$. The band B is provided with loops $b\ b$, to which are attached the straps $b'\ b'$, one of which is passed over the animal's head, behind the horns or the ears, and buckled or otherwise fastened to the other strap, so that the animal's mouth is inclosed in the spherically-shaped frames C C, each covered with the wire-netting C'. To the outer side of each horizontal cross-band $c$ is secured a loop, $d$, on which hangs a rope or chain, E, reaching a little below the bottom of the frame C, and carrying on its lower end the weight F. A spring, G, is secured to each outer side of the frame B, extending downward and pressing with its lower part against the inner side of the curved band $c^2$, the tendency of the said spring G being to throw apart the frames C C when the weight is removed.

The opening and closing of the muzzle is accomplished as follows: The muzzle A being attached to the animal's head, is kept closed by the weights F, hanging down on each side of the frame C, as long as the animal's head is so far above the ground that the weights do not touch the same. As soon as the animal lowers its head so that the weights F rest on the ground, the springs G, attached to the frame B, throw apart the hinged frames C, as shown in Fig. 2, whereby the muzzle A is opened and allows the animal to feed through the opening. As soon as the animal lifts his head, so that the weights F are not supported, the frames C are closed by the weights F overcoming the force of the springs G.

Having thus described my invention, I claim as new and desire to secure by Letters Patent—

1. In a muzzle for cattle, the combination of a main frame, provided with two hinged spherically-shaped frames covered with wire-netting, and a weight attached to each of the said hinged frames, and of springs secured to the main frame and having the tendency to throw the said two hinged frames apart, substantially as shown and described.

2. In a muzzle for cattle, the band B, provided with the loops $b\ b$, in combination with the hinged frames C C and the chains E, carrying the weights F, substantially as herein shown and described.

3. In a muzzle for cattle, the band B, provided with the loops $b\ b$ and the springs G, in combination with the hinged frames C C, covered with wire-netting C' C', substantially as shown and described.

4. In a muzzle for cattle, the band B, provided with the loops $b\ b$ and the springs G G, in combination with the hinged frames C C, covered with the wire-netting C' C', the chains E E and the weights F F, substantially as shown and described.

5. In a muzzle for cattle, the band B, provided with the loops $b\ b$, the straps $b'\ b'$, and the springs G, in combination with the hinged frames C C, consisting of the bands $c$, $c'$, and $c^2$, and covered with the wire-netting C' C', the loops $d\ d$, the chains E E, and the weights F F, substantially as shown and described.

PHILIP PRIOLEAU, JR.

Witnesses:
PHILIP PRIOLEAU,
J. M. BARNETT.